United States Patent
Hoehler et al.

(10) Patent No.: US 10,583,984 B2
(45) Date of Patent: Mar. 10, 2020

(54) DYNAMIC STORAGE RACK UNIT FOR PROVIDING MATERIAL IN LOGISTICS AND MANUFACTURING PROCESSES

(71) Applicant: WERMA Holding GmbH + Co. KG, Rietheim-Weilheim (DE)

(72) Inventors: Christian Hoehler, Wellendingen (DE); Daniel Kensy, Tuttlingen (DE)

(73) Assignee: WERMA Holding GmbH + Co. KG, Rietheim-Weilheim (DE)

( * ) Notice: Subject to any disclaimer, the term of this patent is extended or adjusted under 35 U.S.C. 154(b) by 80 days.

(21) Appl. No.: 15/585,597

(22) Filed: May 3, 2017

(65) Prior Publication Data
US 2017/0327312 A1    Nov. 16, 2017

(30) Foreign Application Priority Data
May 10, 2016 (DE) .......................... 10 2016 108 582

(51) Int. Cl.
*B65G 1/137* (2006.01)
*G06Q 50/28* (2012.01)
(Continued)

(52) U.S. Cl.
CPC ............ *B65G 1/137* (2013.01); *B65G 1/023* (2013.01); *G05B 19/418* (2013.01); *G06Q 10/087* (2013.01); *G06Q 50/28* (2013.01)

(58) Field of Classification Search
CPC ...... B65G 1/137; B65G 1/023; G05B 19/418; G06Q 10/087; G06Q 50/28
See application file for complete search history.

(56) References Cited

U.S. PATENT DOCUMENTS 5,590,796 A * 1/1997 Herman ................. A47F 5/108
                                                  108/99
7,553,118 B1   6/2009 Doepker
(Continued)

FOREIGN PATENT DOCUMENTS

DE    197 14 799 A1    5/1999
DE    198 28 659 A1    5/1999
(Continued)

OTHER PUBLICATIONS

English translation of Applicant provided prior art DE19828659.*

*Primary Examiner* — Thien M Le
*Assistant Examiner* — Asifa Habib
(74) *Attorney, Agent, or Firm* — Breneman & Georges (57) ABSTRACT

The invention proposes a dynamic storage rack unit for providing material in logistics and/or manufacturing processes, having a plurality of storage rack compartments (3) inclined in the longitudinal direction, each storage rack compartment (3) being designed to accommodate a plurality of material containers (4) arranged beside one another in the longitudinal direction, storage rack compartments (3) each having a plurality of sensors (5) for monitoring the filling level of the respective storage rack compartment (3), a distance (A) which corresponds substantially to the length of the material containers (4) to be accommodated in the storage rack compartment (3) being provided in the longitudinal direction between sensors (5) of the respective storage rack compartment (3), storage rack compartments (3) each having at least one state display apparatus (10) for displaying the state and/or filling level of the respective storage rack compartment (3), which unit at least partially improves the disadvantages of the prior art. According to the invention, this is achieved by virtue of the fact that storage rack compartments (3) each comprise at least one compart- (Continued)

ment checking unit (6) for checking the respective sensors (5) of the respective storage rack compartment (3), the compartment checking units (6) each being in the form of energy and data transmission units (6) for supplying the respective sensors (5) of the respective storage rack compartment (3) with electrical energy and for acquiring, receiving and transmitting sensor data from the respective sensors (5) of the respective storage rack compartment (3), at least one storage rack checking unit (7) for checking a plurality of compartment checking units (6) of the storage rack compartments (3) being provided, the at least one storage rack checking unit (7) being designed to supply the plurality of compartment checking units (6) of the respective storage rack compartments (3) with electrical energy and to acquire, receive and transmit data from the plurality of compartment checking units (6) of the respective storage rack compartments (3), at least one central checking unit (11, 12, 13) for checking the at least one storage rack checking unit (7) being provided, the central checking unit (11, 12, 13) being designed to acquire, receive and transmit data from the at least one storage rack checking unit (7).

10 Claims, 3 Drawing Sheets

(51) Int. Cl.
*G06Q 10/08* (2012.01)
*G05B 19/418* (2006.01)
*B65G 1/02* (2006.01)

(56) References Cited

U.S. PATENT DOCUMENTS

| | | | |
|---|---|---|---|
| 2002/0196145 A1* | 12/2002 | Moore | G06K 7/10336 340/572.5 |
| 2003/0174099 A1* | 9/2003 | Bauer | G06K 7/0008 343/893 |
| 2010/0302040 A1* | 12/2010 | Davidowitz | G01S 13/878 340/572.7 |
| 2012/0133490 A1* | 5/2012 | Downie | G06K 19/0717 340/10.1 |
| 2014/0069328 A1 | 3/2014 | Houck et al. | |
| 2016/0055447 A1* | 2/2016 | Sehmer | G06Q 10/087 235/385 |
| 2017/0109558 A1* | 4/2017 | Jones | G06Q 10/087 |
| 2017/0270323 A1* | 9/2017 | Butler | G06K 7/0008 |
| 2018/0064277 A1* | 3/2018 | Wei | G07O 9/00182 |

FOREIGN PATENT DOCUMENTS

| | | |
|---|---|---|
| DE | 100 41 398 A1 | 3/2002 |
| DE | 35 46 956 C2 | 1/2003 |
| DE | 10 2008 037 222 A1 | 1/2010 |
| DE | 20 2010 012 667 U1 | 1/2011 |
| DE | 20 2016 100875 U1 | 3/2016 |
| WO | WO 2004/095300 A1 | 11/2004 |

\* cited by examiner

DYNAMIC STORAGE RACK UNIT FOR PROVIDING MATERIAL IN LOGISTICS AND MANUFACTURING PROCESSES

The invention relates to a dynamic storage rack unit for providing material in logistics and/or manufacturing processes, having a plurality of storage rack compartments inclined in the longitudinal direction, according to the pre-characterizing clause of claim 1.

PRIOR ART

In series production, for example in automobile manufacturing or electronic device production, different component types or components are mostly installed at each workstation. The different components are usually provided in storage containers at the workstation. In this case, it must be ensured that a sufficient number of components and/or storage containers is always provided. The number of storage containers provided at the workstation is therefore intended to be as small as possible so that the space requirement is low, the employees have to cover the shortest possible distances for removal and little capital or material is additionally involved.

In order to ensure a smooth flow of the manufacturing process at the workstation, a sufficient number of the required components must also always be provided, that is to say components or material containers must accordingly be delivered subsequently or replaced again for each container removed or for components removed. In series production, the provision is often organized according to the so-called Kanban principle, inter alia when providing small parts. Smaller parts are parts which do not exceed certain dimensions, with the result that they can usually be accommodated in standardized storage containers of a predefined or indexed size. In this case, numerous small parts are usually accommodated in one storage container.

So-called dynamic storage rack systems have proved successful in series production, in which case an operative places the material or the storage containers into the dynamic storage rack system, that is to say stores the material or the material containers, from a first side or from the rear side, and a second operative usually removes the material container having a plurality of small parts or components for his workstation from the opposite, second side or on the front side of the dynamic storage rack system and produces the corresponding products from a wide variety of small parts or components.

Since the products to be produced are usually manufactured from a wide variety of small parts, such storage rack systems have a wide variety of structures. For example, a dynamic storage rack may have a plurality of storage rack compartments on one level, in which case the storage rack levels are often inclined from the receiving side to the removal side or are oriented in a manner running obliquely downward, with the result that the material containers are moved along the individual storage rack compartments in the direction of the removal side by weight force as far as a stop or a material container which is already in the storage rack compartment.

In the case of more complex series products for example, such dynamic storage rack systems do not only have a single storage rack level, but rather have a plurality of storage rack levels which are arranged above one another and are oriented in an inclined manner. This means that, in practice, dynamic storage rack units having a total of 7×5 storage rack compartments are arranged above one another or beside one another, for example. In contrast, in order to produce another product, a dynamic storage rack system having 1×4 storage rack compartments, that is to say a single storage rack level having four separate storage rack compartments which are inclined and are arranged beside one another for four different components/containers, is provided, for example.

In the meantime, checking or monitoring/control systems have already been used for such dynamic storage rack units, in which case sensors which are arranged in the grid or in the spacing of the respectively used material container dimensions along a storage rack compartment can be used to determine whether there are still material containers in the respective storage rack compartment and how many material containers are in the respective storage rack compartment. For assistance and in order to avoid errors, lamps or illuminated displays have already been arranged on each storage rack for the operatives. These state displays indicate or signal to the operative whether sufficient material containers are in the respective storage rack compartment and/or whether the respective storage rack compartment has too few material containers and replenishment or new, filled material containers must accordingly be inserted or which components/containers have to be removed.

For the storeman or the operative who is intended to subsequently deliver new, filled material containers, such a display or luminaire is arranged on the receiving side or rear side of the dynamic storage rack/storage rack compartment, and/or, for the removing operative or for the workstation, a display or luminaire is arranged on the removal side, with the result that it is respectively possible to indicate to the operative that there is a need for action with respect to this storage rack compartment.

Accordingly, detection or checking systems for such dynamic storage rack systems need to be adapted to a wide variety of requirements, which concerns, in particular, a different number of individual storage rack compartments and/or storage rack levels. In addition, a wide variety of numerous components such as sensors, displays, evaluation units or the like need to be provided and have to each be connected electrically/using data technology.

However, previous systems are comparatively complicated and inflexible and have a high degree of cabling complexity, which has an economically unfavorable effect, in particular, and in which case errors can arise comparatively easily during mounting/installation and during operation.

OBJECT AND ADVANTAGES OF THE INVENTION

In contrast, the object of the invention is to propose a dynamic storage rack unit for providing material in logistics and/or manufacturing processes, having a plurality of storage rack compartments inclined in the longitudinal direction, which unit at least partially improves the disadvantages of the prior art.

Proceeding from a dynamic storage rack unit of the type mentioned in the introductory part, this object is achieved by means of the features of claim 1. Advantageous embodiments and developments of the invention are possible by means of the measures mentioned in the subclaims.

Accordingly, a dynamic storage rack unit according to the invention is distinguished by the fact that storage rack compartments each comprise at least one compartment checking unit for checking the respective sensors of the respective storage rack compartment, the compartment checking units each being in the form of energy and data transmission units for supplying the respective sensors of the respective storage rack compartment with electrical energy and for acquiring, receiving and transmitting sensor data from the respective sensors of the respective storage rack compartment, at least one storage rack checking unit for checking a plurality of compartment checking units of the storage rack compartments being provided, the at least one storage rack checking unit being designed to supply the plurality of compartment checking units of the respective storage rack compartments with electrical energy and to acquire, receive and transmit data from the plurality of compartment checking units of the respective storage rack compartments, at least one central checking unit for checking the at least one storage rack checking unit being provided, the central checking unit being designed to acquire, receive and transmit data from the at least one storage rack checking unit.

Such compartment checking units which are each assigned to a storage rack compartment, a plurality of compartment checking units being assigned to a single or common storage rack checking unit and a plurality of storage rack checking units in turn possibly being assigned to a single or common central checking unit, can be used to implement an advantageous system architecture which can be flexibly adapted to a wide variety of storage rack systems or applications. The dynamic storage rack unit according to the invention can be advantageously expanded or reduced in a module-like or modular manner and/or can be adapted to already existing dynamic storage racks.

With the aid of the invention, the number of compartment checking units is therefore preferably identical to the number of storage rack units, for example irrespective of whether the dynamic storage rack system, for example, has or already has a storage rack compartment matrix of 4×5 storage rack compartments or 2×20 storage rack compartments or 12×3 storage rack compartments. That is to say, the dynamic storage rack units can be arbitrarily constructed in a matrix-like manner, the respective matrix consisting of separate storage rack compartments which are accordingly arranged beside one another and/or above one another.

In an advantageous manner, a compartment checking unit may also respectively have a firmly predefined number of sensors, preferably four sensors, which are each fixed or mounted along the storage rack compartment or in the longitudinal direction along the storage rack compartment, in particular along one or more storage rack rails or the like. This makes it possible to achieve a standardized or defined compartment module, that is to say a compartment module comprises at least one (single) compartment checking unit and a plurality of sensors in each case, in particular between two and four sensors. The advantageous compartment module is arranged on the respective individual storage rack compartment or is assigned to the latter. A storage rack compartment module may additionally have yet further operating elements such as a signaling/display apparatus such as a lamp, an LED, a loudspeaker, a so-called beep, for each storage rack compartment or compartment checking unit. In this case, the compartment checking unit may implement the (electronic and/or electrical or data processing) checking, acquisition, preprocessing and/or forwarding etc, of the data/information at least from and/or for the module component/elements of the respective storage rack compartment. That is to say, the compartment checking unit of the respective storage rack compartment checks/controls/regulates all components/elements specific/relevant to the storage rack compartment as far as possible and in this case also interacts or exchanges data/information with the storage rack checking unit of the entire storage rack.

A plurality of/all compartment checking units or storage rack compartment modules of a storage rack in the sense of the invention are advantageously connected or cabled to a (single) storage rack checking unit, with the result that all storage rack compartments or compartment checking units or storage rack compartment modules to be detected and, in particular, also the further operating elements, such as a signaling/display apparatus such as a lamp, an LED, a loudspeaker, a so-called beep, are each advantageously assigned to a single storage rack checking unit. This implements a clear and error-avoiding structure or architecture of the elements or components, which has an advantageous effect on the cabling complexity and on the error tolerance of the system.

The compartment checking units and/or the sensors are preferably both supplied with electrical energy and connected using data technology with the aid of the storage rack checking unit. This means that both the energy supply and the sensor data or information/electronic data from the entire dynamic storage rack unit or from all detected storage rack compartments are advantageously implemented via the respective storage rack checking unit.

The advantageous central checking unit may link, for example, a plurality of (decentralized) storage rack checking units and therefore a plurality of dynamic storage racks at least using data technology, with the result that it becomes possible to centrally detect or check all storage rack compartments or all dynamic storage racks. For example, the central checking unit can be used to implement a connection to a superordinate business management (company-wide) data processing system. For example, the central checking unit can connect the sensor data, in particular sensor data preprocessed by the compartment checking units and/or storage rack checking units, to a central business management system or logistics system or the like. This may have both communication only in one direction, that is to say from the sensors via the compartment checking units to the storage rack checking unit and in turn to the central checking unit, and in a bidirectional manner that is to say both in the one direction and back in the opposite direction. This makes it possible to implement advantageous statistical evaluations and/or regulation/control operations, for example the replenishment of material containers for the dynamic storage rack system and/or for removal or production at the workstation.

It is particularly advantageous that advantageous retrofitting of existing dynamic storage racks can be achieved with the aid of the dynamic storage rack unit according to the invention. Kanban storage racks or the like which already exist and are not monitored or detected using sensors can therefore be retrofitted with the aid of the present system and can therefore be incorporated in already existing business management data processing systems, for example.

In one advantageous embodiment of the invention, a series connection of a plurality of compartment checking units and/or a plurality of storage rack checking units is provided. This means that it becomes possible, for example, to advantageously assign or evaluate/use the sensor data without a large amount of effort. For example, it is possible to dispense with complicated addressing of the compartment checking units or storage rack checking units. Rather, the (fixed) arrangement of the compartment checking units or of the storage rack checking units in the series connection according to the invention can already have a permanently assigned position or virtually an address on account of their position in the series connection, with the result that it is possible to dispense with bus addressing or bus communication using data technology with an accordingly large amount of effort. This means that, for example, the compartment checking unit connected/arranged at position 1 in the series receives the number or address 1 and the compartment checking unit at the second position in the series connection receives the number or address 2 etc. Virtually automatic addressing is thus virtually achieved by the connection/installation of the compartment checking units or storage rack checking units without the need for bus addressing/bus communication with corresponding DIP switches or the like, for example.

A star connection of a plurality of storage rack checking units is advantageously provided. This increases the flexibility of the invention or the achievable structure or architecture of the components. In this development of the invention, it is particularly advantageous if, in the case of the star connection of a plurality of storage rack checking units, each storage rack checking unit has an address or an assignability of the transmitted data during data transmission or communication with the central checking unit.

As an alternative to or at least partially in combination with the above-mentioned (fixed) arrangement of the compartment checking units or the storage rack checking units, in which case a permanently assigned position is allocated to the respective units on the basis of their position in the series connection or virtually automatic addressing is achieved, automated position detection or position allocation/addressing of the compartment checking units and/or of the storage rack checking units can be advantageously implemented.

In one particular development of the invention, at least the storage rack checking unit and the compartment checking units of a respective storage rack compartment each comprise a position detection unit having at least one transmitter for transmitting information/signals and having at least one receiver for receiving information/signals. This makes it possible to advantageously interchange information/signals for position detection between the checking units, that is to say in particular between the storage rack checking unit and at least one of the compartment checking units or the compartment checking units and/or between two/the compartment checking units, in particular using/via cables/lines which connect the checking units.

In one preferred variant of a series connection of a plurality of compartment checking units with at least one storage rack checking unit, each checking unit of the storage rack compartment, that is to say the storage rack checking unit and all compartment checking units, can advantageously transmit a first item of information/message (at the same time or at least partially offset in terms of time or in succession) in a (respective) first operating step/cycle using the respective transmitter, which information/message is received by the adjacent checking unit or possibly all checking units using the respective receiver. These first messages are advantageously transmitted (in particular at the same time and/or synchronously) by all checking units in the series connection in the same direction or in a first direction, preferably from the storage rack checking unit in the direction of the compartment checking units or the adjacent ("first") compartment checking unit. However, it is also conceivable for the first message to be respectively transmitted in both directions of the series connection inside the series connection. This is not a relevant disadvantage.

Subsequently or in a second/further operating step/cycle, at least one checking unit or preferably each checking unit of the storage rack compartment, that is to say the storage rack checking unit and all compartment checking units, will advantageously transmit a response or a second item of information/message (in particular at the same time and/or synchronously) using the respective (first) transmitter or using a second transmitter or a response transmitter, which response or information/message is received at least by the adjacent checking unit using the respective (first) receiver or using a second receiver or a response receiver. In this case, however, the response or "second" message is advantageously transmitted or answered in the direction opposite the first direction, that is to say a confirmation or acknowledgement, in particular a so-called ACK signal, is advantageously transmitted (back). Accordingly, the "last" checking unit, in particular a compartment checking unit, inside the series connection of the storage rack compartment does not receive a response or a "second" message, that is to say does not receive an acknowledgement signal.

The/each position detection unit preferably comprises at least one controller, in particular a so-called microcontroller or the like. The controller of each checking unit of the storage rack compartment, that is to say of the storage rack checking unit and of all compartment checking units, advantageously detects whether or not a response or a second message could be received. As a result, the controller of the "last" checking unit, in particular of the "last" compartment checking unit, "knows" or registers that it is the "last" controller or the "last" checking unit or "last" compartment checking unit of the series connection and/or of the storage rack compartment.

A first cycle or message/response cycle of the position detection phase is therefore substantially concluded.

In one particular variant of the invention, this "last" controller advantageously checks the transmitter or response transmitter of this "last" checking unit for the subsequent time or further operating steps/cycles of the position detection phase. This can be provided, for example, to the effect that this checking unit or this transmitter does not transmit a response or a "second" message in the further course of the position detection phase in the sense explained above or at least transmits a special response as the "last" checking unit. This means that a "last" checking unit or "last" controller subsequently does not transmit a response or a "second" message in the sense explained above during the position detection phase, that is to say does not accordingly respond/react in the same manner as the other checking units or no longer responds/reacts to a "first" message, but rather possibly responds with a "last response" if necessary.

In the further course of the position detection phase, a second cycle or second message/response cycle of the position detection phase can then advantageously follow in a first conceivable variant of the invention. For this purpose, a so-called "first" or virtually "third" message is again transmitted by the checking units (in particular at the same time and/or synchronously). In this case, the checking unit previously designated/assessed as the "last" checking unit in the series connection, for example, now need not necessarily transmit a "first" message since this would be without a relevant disadvantage or is superfluous/unnecessary to a certain extent.

The checking unit designated/assessed as the "last" checking unit in the series connection previously or in the "first" cycle preferably does not transmit a response or a "second" or virtually "fourth" message, that is to say does not transmit a confirmation or acknowledgement signal, at least in the "second" cycle or in the "fourth" operating step/cycle. Accordingly, the "second last" checking unit, in particular the compartment checking unit, inside the series connection and/or the storage rack compartment now does not receive a response or a "second"/"fourth" message. As a result, the controller of this "second last" checking unit, in particular of the "second last" compartment checking unit, again "knows" or registers that it is the "second last" controller or the "second last" checking unit or "second last" compartment checking unit of the series connection and/or of the storage rack compartment.

These cycles or message/response cycles are advantageously repeated until all checking units, in particular compartment checking units, "know" their position or address/number inside the series connection or the storage rack system, that is to say have been assigned it, in particular. During each cycle, virtually the series connection or the respective "last" checking unit/compartment checking unit is advantageously "counted down" until the "first" checking unit, in particular the storage rack checking unit, does not receive a response or a so-called "second" message. The position detection phase can therefore be terminated in this first conceivable variant of the invention.

In a preferred second or alternative variant of the invention, the storage rack checking unit transmits a (first numerical) message to the "first" or adjacent compartment checking unit of the storage rack compartment using the respective (first) transmitter, preferably the information stating that this "first" or adjacent compartment checking unit is the "first compartment checking unit". This first compartment checking unit hereby advantageously simultaneously receives the address or number "one" of the (respective) storage rack compartment. The "first" compartment checking unit advantageously transmits a response or message, that is to say a confirmation or acknowledgement, in particular a so-called ACK signal, to the storage rack checking unit of the storage rack compartment in a further cycle/operating step.

In a further cycle/operating step, the "first" compartment checking unit then transmits a ("second" numerical) message to the "second" or adjacent compartment checking unit of the storage rack compartment, preferably the information stating that this "second" or adjacent compartment checking unit is the "second compartment checking unit". This first compartment checking unit hereby advantageously simultaneously receives the address or number "two" of the (respective) storage rack compartment. The "second" compartment checking unit advantageously in turn transmits a response or message, that is to say a confirmation or acknowledgement, in particular a so-called ACK signal, to the "first" compartment checking unit of the storage rack compartment in a further cycle/operating step.

These cycles are advantageously repeated until all checking units, in particular compartment checking units, "know" their position or address/number inside the series connection or the storage rack system, that is to say have been automatically assigned it, in particular.

The checking units, in particular compartment checking units, can finally advantageously communicate their position or address/number inside the series connection to the storage rack checking unit of the storage rack compartment and/or to the central checking unit.

The advantage of the second or alternative variant of the invention over the above-mentioned first conceivable variant of the invention is that it requires fewer cycles/operating steps and can be carried out more quickly.

One particularly preferred embodiment of the invention is a "mixed form" of the two above-mentioned variants of the invention. In this case, in order to determine the "last" checking unit, the above-mentioned first cycle or message/response cycle of the position detection phase of the first variant of the invention is preferably carried out and the second variant of the invention with the transmission of one or more "numerical" messages and, in particular, with a response or message, that is to say a confirmation or acknowledgement, in particular a so-called ACK signal, in a further cycle/operating step is then provided as a second cycle or message/response cycle of the position detection phase, that is to say in a subsequent or "third" cycle/operating step of the position detection phase. This makes it possible to implement very quick and, at the same time, particularly flexible and reliable automated addressing and position detection.

It is also conceivable for comparable automated addressing and position detection to also be able to be carried out or provided with respect to (a plurality of) storage rack checking units. Accordingly, a plurality of storage rack compartments or storage rack checking units could be accordingly addressed or numbered by means of one of the variants mentioned above, in which case the plurality of storage rack checking units could correspond to the plurality of compartment checking units and the central checking unit could correspond to the storage rack checking unit of the storage rack compartment.

Consequently, advantageous automated position detection or position allocation/addressing of the compartment checking units and/or of the storage rack checking units can be implemented. This makes it possible to advantageously flexibly adapt the entire checking or operation of a dynamic storage rack unit according to the invention to a wide variety of storage rack systems having a very different number of storage racks and/or storage rack compartments and/or checking units, that is to say storage rack checking units and/or compartment checking units.

Very rapid communication between a plurality of checking units of the system can generally be achieved by means of simultaneous and/or clocked transmission and/or reception, which advantageously accelerates the position detection and shortens the position detection phase. It is accordingly possible to quickly arbitrarily assemble checking units or the dynamic storage rack unit according to the invention in a wide variety of sizes and structures without a large amount of effort.

In principle, all components used can be advantageously connected to one another via electrical connecting lines or electrical wires/cables. At least one radio unit for wirelessly transmitting data and/or energy at least between the central checking unit and the at least one or more storage rack checking units is preferably provided. It is also possible to negotiate comparatively large distances without a large amount of effort, in particular with the aid of wireless radio transmission of data/information between the central checking unit, such as a central computer, server or the like, and the at least one storage rack checking unit or a plurality of storage rack checking units. This is particularly advantageous, in particular, when retrofitting dynamic storage racks with the aid of the present system according to the invention and incorporating them in existing data processing, for example business management data processing, in particular software or the like. Advantageous cabling can therefore be definitely specifically implemented in situ or directly on or in the dynamic storage rack, and the data communication with the control center or the central checking unit can then be implemented in a unidirectional and/or bidirectional manner, for example, in a wireless manner or via radio with the aid of the radio unit.

In addition, a sensor radio unit for wirelessly transmitting data and/or energy at least between the central checking unit and one of the sensors is definitely also provided. This makes it possible, for example, to directly transmit the data from the respective sensor to the central checking unit or to the central computer/server or the like. In this case, sensor data which have not been preprocessed can be directly transmitted to the central checking unit, for example in a unidirectional and/or bidirectional manner.

The sensor data are preferably preprocessed or processed with the aid of the respective compartment checking unit and/or the respective storage rack checking unit, with the result that data which have already been advantageously preprocessed or compressed can be transmitted to the central checking unit.

The state display apparatus is advantageously arranged at least in an accommodating end region of the storage rack compartment and/or on the storage rack checking unit. The state display apparatus, for example arranged/integrated on/in the storage rack checking unit, can therefore hereby provide the respective operative, who has to fill the dynamic storage rack or replenish the dynamic storage rack unit according to the invention, with an optical signal, for example, indicating that there is a need for action with respect to this respective storage rack compartment, for example replenishment or a filled, new material container is missing or needs to be stored. This prevents incorrect filling of the storage rack compartments or placement of a material container in an incorrect storage rack compartment to the greatest possible extent.

In one particular development of the invention, at least one input unit for inputting/reading information/data relating to a material container and/or a material is provided/arranged on the storage rack checking unit. For example, the input unit is in the form of a keypad, in particular a numerical keypad, an RFID or QR or barcode reader or an optical scanner or the like. The input unit, for example arranged/integrated on/in the storage rack checking unit, may also be in the form of a camera and/or a video camera, as a result of which the respective material or the material container can be entered into the data processing system and processed further as a photo file or a video file.

With the aid of the advantageous input unit, an operative, for example, can input a material to be replenished or a material container to be replenished into the system and a corresponding article number can be hereby advantageously captured and processed for the further evaluation or data processing.

The input device or the input unit may be connected to the storage rack checking unit, for example, via an interface, for example a USB interface or the like. It is also conceivable for the respective operative or storeman to carry a smartphone or a separate telecommunications device, for example, and to record and input data or information relating to the material container and/or the material with the aid of his smartphone or the like and to transmit said data or information to the storage rack checking unit and/or central checking unit for further processing. For example, the central checking unit and/or the storage rack checking unit can then accordingly switch a state display apparatus of the dynamic storage rack unit and can indicate to the operative or the storeman that storage rack compartment into which the material container just input should be placed, for example. This can be indicated by means of a green luminous signal or the like, for example.

Further display apparatuses of the dynamic storage rack unit according to the invention may also be in a signal state which emits red light, with the result that the operative or storeman correctly places the respective material container into the only storage rack compartment indicated with a green luminous signal color. In the above-mentioned embodiment, the state display apparatus is simultaneously in the form of an optical warning unit for optically warning of incorrect action.

An output unit for outputting/displaying information/data relating to a material container and/or a material is preferably provided. In this case, it becomes possible for the operative or the storeman or the like, for example, to be provided with a display of the article number and/or other information or titles/designations of the material on a screen, a display or the like of the storage rack checking unit, for example. This makes it possible to provide the operative or storeman with feedback or checking.

The output unit is advantageously in the form of an acoustic and/or optical warning unit for acoustically and/or optically warning of incorrect action. This reduces incorrect action, that is to say incorrect accommodation of a material container in an incorrect storage rack compartment and/or incorrect removal from the incorrect storage rack compartment, for example with the aid of a luminous element and/or a loudspeaker, a piezo loudspeaker, a sound capsule or the like. An acoustic signal for correct action and a second acoustic signal which differs therefrom, for example in a different pitch and/or melody, in the case of incorrect action are preferably provided.

At least one acknowledgement or confirmation unit for confirming actions which have been carried out is preferably provided. This means that an operative or storeman advantageously confirms or acknowledges the replenishment of a storage rack compartment by means of a material container, in particular with the aid of the advantageous input unit. The system, in particular the data processing system, hereby receives the information or data relating to the action which has been carried out, with the result that verifiability of correct action and therefore an error-free method of operation are ensured.

EXEMPLARY EMBODIMENT

One exemplary embodiment of the invention is illustrated in the drawing and is explained in more detail below using the figures.

Specifically.

Figure 1:
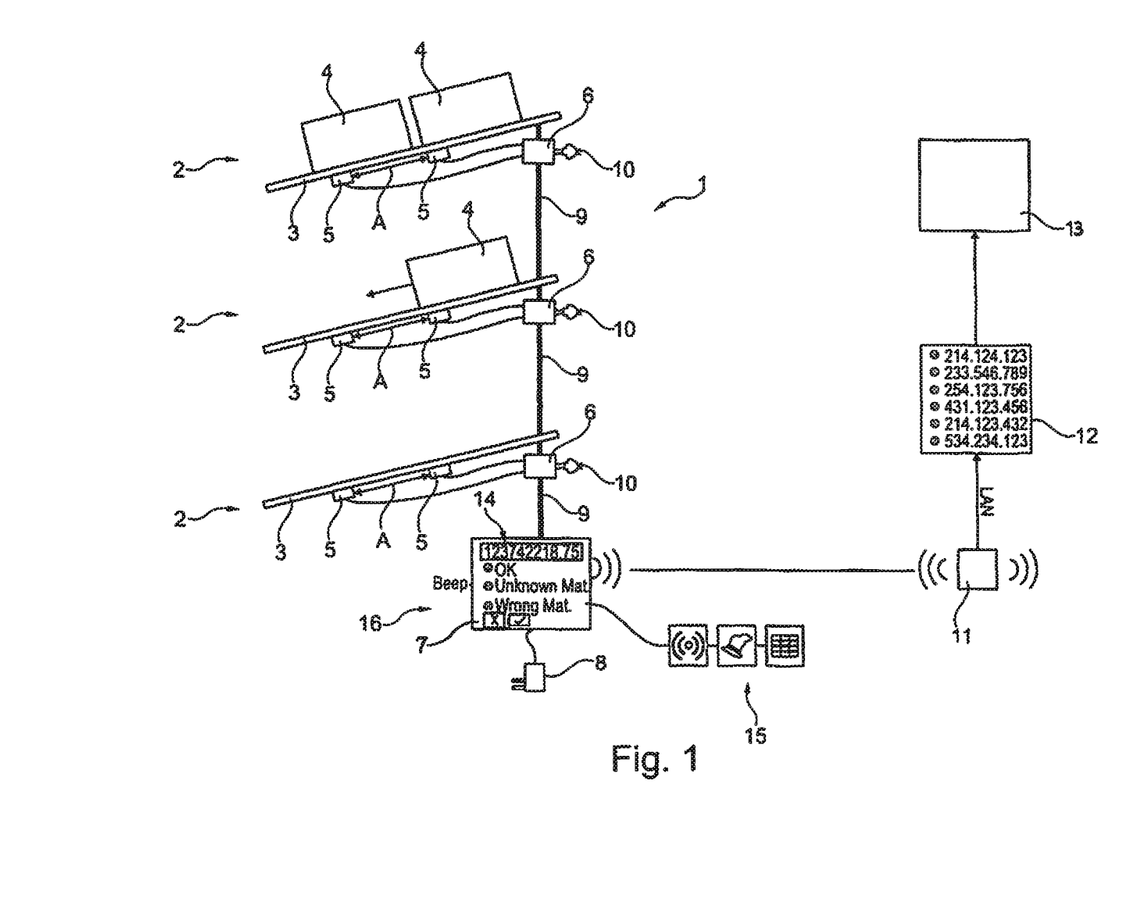
FIG. 1 shows a schematic structure of a dynamic storage rack unit according to the invention.

FIG. 1 schematically illustrates a storage rack 1, in which case a storage rack compartment 3 is respectively depicted on a plurality of, specifically three, illustrated storage rack levels 2. Consequently, a 1×3 storage rack matrix can be seen as the exemplary embodiment. Without a more detailed illustration, further storage rack compartments 3, for example seven separate storage rack compartments 3, could be arranged, for example, directly "behind" the illustrated storage rack compartments 3, that is to say on the storage rack levels 2, with the result that an 8×3 storage rack matrix would then be implemented, in which case each of the seven (vertical) storage rack columns would structurally correspond to the "front" storage rack columns illustrated or the storage rack compartments 3 illustrated. Storage rack compartments 3 of different widths could also be provided, with the result that only four separate storage rack compartments 3 could be provided on the uppermost level, for example, and eight storage rack compartments 3, for example, could be provided on the middle storage rack level 2. The width (oriented perpendicular to the plane of the sheet) of the storage rack compartment(s) 3 should preferably be adapted to a width of material containers 4 of the respective storage rack compartment 3 or corresponds to this width.

The storage rack level 2 and the storage rack compartments 3 are arranged in a manner inclined with respect to the horizontal plane, with the result that standardized material containers 4, for example standard component boxes or the like, are moved, without a more detailed illustration, with the aid of rollers, rolls etc. of the storage rack compartments 3 by means of weight force to a lower end of the storage rack compartment 3 or to a container 4 which is already present in the storage rack compartment 3. In this case, advantageous stops are provided at the end, but are not explicitly illustrated in FIG. 1.

A storage rack compartment 3 also has a plurality of sensors 5, preferably four sensors 5, which are fixed at a distance A from one another on the storage rack compartment 3 or on a storage rack compartment rail. The distance A corresponds substantially to the dimensioning of the container 4 or to the length of the container 4 and is possibly longitudinally adjustable/displaceable in order to be adaptable to a wide variety of containers 4 if production is changed, for example. This achieves advantageous rasterization of the sensor arrangement along the storage rack compartment 3 along the movement path of the containers 4.

Accordingly, after a storage rack compartment 3 has been filled by an operative or storeman (not illustrated in any more detail), the container 4 may automatically roll or move by weight force along the inclined storage rack compartment 3 to a removal side or end position (not illustrated in any more detail). The sensors 5 then each advantageously detect the presence or absence of a container 4 in the region of the respective sensor 5. Optical sensors, in particular light barriers, infrared sensors, mechanical switches or the like are provided for this purpose, for example.

It has been shown that four sensors 5 are sufficient to ensure advantageous operation of corresponding dynamic storage rack units 1 without the operating sequence coming to a standstill in the case of series production or the like and without capital or components being unnecessarily involved.

At least one compartment checking unit or a sensor box 6 is respectively provided/fixed for each storage rack compartment 3. This sensor box 6 is (electrically/electronically) connected to the respective sensors 5 of the respective storage rack compartment 3, preferably by cable, as depicted. The individual sensor boxes 6 of the respective storage rack compartments 3 are also in turn (electrically/electronically) connected to one another. An electrical/electronic series connection of the sensor boxes 6 to one another is preferably provided, a storage rack box 7 or a common storage rack checking unit 7 being provided at one end of the series connection. It becomes clear in FIG. 1 that the storage rack box 7 has an electrical connection plug 8, which is symbolically intended to represent the electrical energy supply for the system.

Accordingly, the sensor boxes 6 of the storage rack 1 are supplied with electrical energy by the storage rack box 7, for example 230 V transformed to 12 V or 24 V for the sensor boxes 6. Not only the electrical energy supply but also the electronic interchange of data, in particular bidirectional interchange of data, can be implemented at the same time using corresponding cables 9 which implement the series connection of the sensor boxes 6 to one another and the electrical connection to the storage rack box 7.

In the exemplary embodiment illustrated, a display luminaire 10, which signals the state of the respective storage rack compartment 3 and the presence/absence of the containers 4 of the respective storage rack compartment 3, is respectively depicted on the sensor boxes 6. The two upper luminaires 10 in FIG. 1, for example, therefore each emit red light since the respective storage rack compartment 3 has (sufficient) material containers 4. This accordingly demonstrates to the operative/storeman (not illustrated in any more detail) that sufficient material or material containers 4 is/are provided here.

In contrast, the lower storage rack compartment 3 according to FIG. 1 does not have a container 4, with the result that the two sensors 5 of the lower storage rack compartment 3 detect an "absence" and the system therefore causes the luminaire 10 to emit green light, for example, in order to indicate to the operative/storeman that a material container 4 needs to be replenished here or the storage rack compartment 3 needs to be filled.

Accordingly, a corresponding luminaire may be additionally and/or alternatively provided, without a more detailed illustration, on the removal side (not illustrated any more specifically or in any more detail) in order to signal to the corresponding operative that he should remove material from this storage rack compartment 3, in particular again by means of a green luminous color and/or by means of a display or a screen display or the like.

In addition, the storage rack box 7 is designed in such a manner that it can wirelessly communicate with a central checking unit 11 in the present exemplary embodiment by radio (cf. symbol of the transmitting/receiving waves), in particular in a bidirectional manner. This central checking unit 11 or a so-called "master" 11 is connected to a data memory 12 (only symbolically illustrated) and/or to a business management system 13 or business management software by means of data cable/LAN or the like, for example. This makes it possible to accordingly acquire, store, evaluate and preprocess the data or information from the sensors 5 of the storage rack compartments 3 and to advantageously use said data or information for business management data processing and, in particular, to optimize the in-house logistics flows etc. The corresponding company has therefore recorded its entire stocks of the storage racks 1 electronically or using data technology and can advantageously evaluate them accordingly or can carry out statistical analyses or the like. For example, a wide variety of analysis modules or the material movements/flows can be analyzed and optimized, in which case a wide variety of interfaces to a wide variety of data technology systems can be advantageously used to determine, inter alia, no stocks/excess stocks or the like and to display and optimize the latter.

An optical display with respect to the states of the storage rack compartments 3 and/or of the (read) identification or designation of the material containers 4 can be (additionally) displayed for the corresponding operative, in particular with the aid of the advantageous luminaires 10 and/or a display 14 of the storage rack box 7 or by means of (a plurality of) display LEDs of the storage rack box 7, for example. For example, an advantageous input unit 15, in particular a numerical keypad, a scanner, an RFID reader or the like, is connected, for example by an interface, in particular a USB interface or the like, to the storage rack box 7, with the result that an operative/storeman, for example, hereby reads an identifier of the material container 4 into the data information system, is provided with a display using the display 14 and is provided with an indication of which storage rack compartment 3 is provided for this purpose by means of the luminaires 10. This effectively avoids/reduces (human) errors during storage or replenishment.

In addition, a storage rack box 7 may also advantageously have an acoustic signal device, for example a loudspeaker or a piezo loudspeaker or the like, in order to acoustically signal an error, for example incorrect storage or the like.

It also becomes clear in FIG. 1 that the dynamic storage rack system according to the invention can be advantageously adapted in a modular manner to the number of storage rack compartments 3 or storage rack levels 2 of a wide variety of storage racks 1. A comparatively small degree of cabling complexity can also be achieved since, for example, a sensor box 6 containing the respective associated sensors 5 can be fitted to any storage rack compartment 3 in a form prepared or prefabricated in a modular manner. At the same time, the sensor boxes 6 may each be electrically connected to one another and to the storage rack box 7 without resulting in a large degree of cabling complexity. If necessary, the electrical connections or cables between the sensor boxes 6 and the storage rack box 7 are also already prefabricated or standardized, which reduces the installation/mounting complexity and/or incorrect installation and/or possibly the positioning or addressing complexity of the boxes 6, 7.

In principle, it is conceivable for both a sensor box 6 and a storage rack box 7 to each directly forward and/or pre-process the received or incoming data/information, in particular with the aid of a respectively included controller or microprocessor or the like.

The advantageous radio transmission between the storage rack box 7 and the central checking unit 11 or the master 11 also makes it possible to bridge larger distances in a company or in a larger company building or production hall or the like without the need for a large degree of complexity for the cabling or technology for connection to a central computer system or to a business management data processing system or the like. Accordingly, a storage rack box 7 receives the states or the position of the sensor box 6 via a wired or wireless connection 9. Said information/data is/are transmitted to the master 11 via a further connection, in particular in a wireless manner according to FIG. 1.

For example, the input unit 15 or a barcode scanner, an RFID scanner, a keypad or the like can be used to scan in a material number or identifier or a code, for example, the storage rack box 7 receiving the material number by means of a connection, for example a USB cable etc., to the storage rack box 7 and displaying it on the display 14 and/or transmitting it to the master 11. The master 11 passes this material number to the memory 12 by means of LAN/USB or the like, software advantageously comparing this material number by means of a database or a data memory 12 and checking it in order to determine the storage rack compartment 3 in which this material is intended to be stored.

The software or the system transmits the data/information relating to the correct storage rack compartment 3 to the master 11 and the master 11 in turn transmits this to the storage rack box 7. The storage rack box 7 now indicates, via the display 14 and/or with the aid of the luminaires 10, the storage rack compartment 3 in which the material is intended to be/must be stored.

In the case of storage in the correct storage rack compartment 3, an acknowledgement tone is effected by means of the loudspeaker 16, for example, or by means of an error tone from the loudspeaker 16 in the case of storage in an incorrect storage rack compartment 3. In addition, the error can also be optically signaled by means of the luminaire 10.

Figure 2:
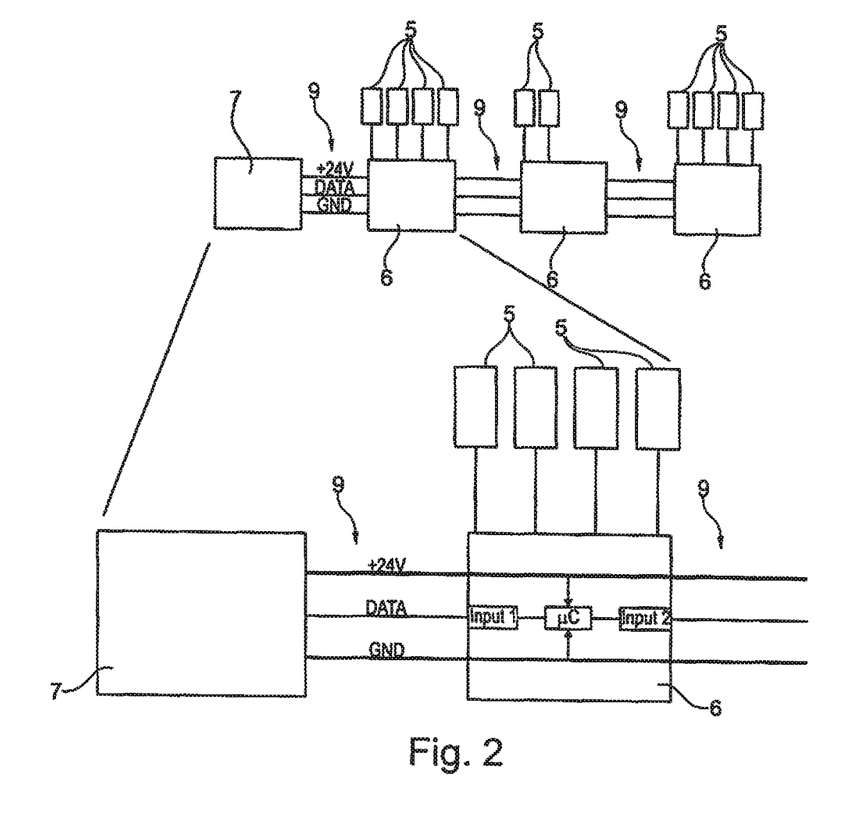
FIG. 2 shows a schematic circuit diagram of a section of the dynamic storage rack unit according to FIG. 1, and FIG. 3 schematically illustrates data transmission by means of a parallelized forwarding routine between checking units of a dynamic storage rack unit according to the invention.

FIG. 2 schematically illustrates a section of the system according to FIG. 1, in which case a wide variety of sensor boxes 6 are connected in series with a storage rack box 7. The sensor boxes 6 are also each connected to/equipped with a plurality of sensors 5.

A three-wire cable or a three-wire connection of the boxes 6, 7 is preferably provided. However, a two-wire connection can also be definitely implemented, in which case the data/information can be modulated onto the supply lines in a known manner, for example. Alternatively, wireless transmission or radio transmission between the boxes 6, 7 can be implemented.

Figure 3:
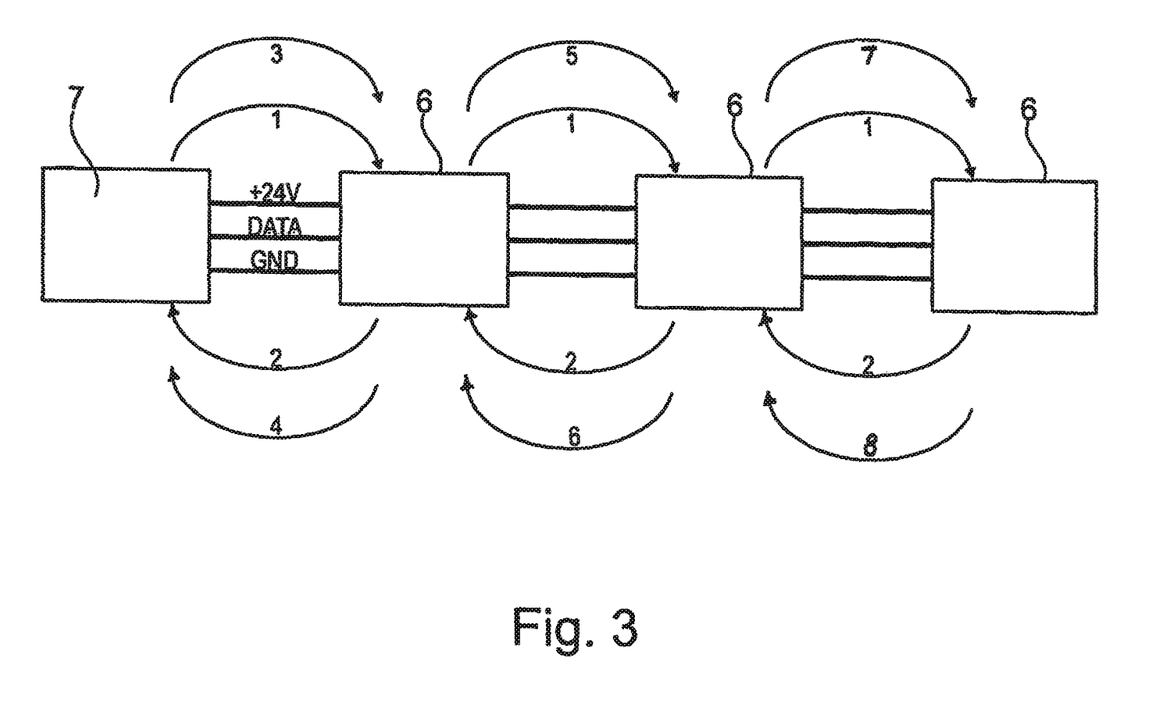

In an advantageous manner, the inputs/outputs are automatically detected and the last sensor box 6 is detected. FIG. 3 therefore illustrates a preferred variant of automatic position detection. In this case, a storage rack box 7 advantageously transmits an item of information or a so-called "polling message" to the adjacent box 6 (cf. first curved arrow with the number 1 according to FIG. 3). As a result, this sensor box 6 "knows" that its input 1 is connected to the storage rack box 7 and confirms this, for example, with a response, for example an acknowledgement signal or a so-called ACK signal (first curved arrow with the number 2 according to FIG. 3). This sensor box 6 also transmits (at the same time as the storage rack box 7) an item of information or message to the adjacent sensor box 6 (second curved arrow with the number 1 according to FIG. 3). This neighboring sensor box 6 now "knows" that its input 1 is connected to the sensor box 6 arranged before it and likewise confirms this with a response, for example an acknowledgement signal or an ACK signal (second curved arrow with the number 2 according to FIG. 3).

According to a variant of automatic position detection (not illustrated in any more detail), this could accordingly continue until the last sensor box 6 in the series connection does not receive a response from the next "neighboring sensor box" 6 which is not present. If a response, for example an acknowledgement signal or a so-called ACK signal, does not come from the neighboring box, the last sensor box 6 in the series connection according to FIG. 3 "knows" that it is the last sensor box 6 inside the communication system.

According to the preferred variant illustrated in FIG. 3, however, only an advantageous signal or an item of numerical information is transmitted from the storage rack box 7 to the adjacent box 6 in the "third" operating step/cycle, for example a (digital) "zero" (cf. curved arrow with the number 3 according to FIG. 3). As a result, this sensor box 6 or its controller "knows" that it is the "first" sensor box 6 which is directly connected to the storage rack box 7 and optionally confirms this, for example, with a response, for example an acknowledgement signal, in particular a so-called "polling message" (curved arrow with the number 4 according to FIG. 3), in a "fourth" operating step/cycle.

In a "fifth" operating step/cycle, this "first" sensor box 6 then transmits an advantageous signal or an item of numerical information to the next or adjacent sensor box 6, for example a (digital) "one" (cf. curved arrow with the number 5 according to FIG. 3). As a result, this neighboring sensor box 6 or its controller "knows" that it is the "second" sensor box 6 which is directly connected to the "first" sensor box 6 and optionally confirms this, for example, with a response, for example an acknowledgement signal, in particular a so-called "polling message" (curved arrow with the number 6 according to FIG. 3), in a "sixth" operating step/cycle.

In the example illustrated in FIG. 3, the position of all sensor boxes 6 is now known or all sensor boxes have a unique or particular "address"/numbering since the "last" sensor box 6 already "knows" by means of the first two operating steps/cycles that it is the "last" sensor box 6. However, operating steps/cycles "seven" and/or "eight" can also be optionally carried out (cf. curved arrows with the numbers 7 and 8 according to FIG. 3).

Automated position detection or position allocation/addressing can be implemented using these advantageous communication systems or the parallel forwarding routine which is schematically illustrated, inter alia, in FIG. 3. The invention can be hereby advantageously flexibly adapted to a wide variety of storage rack systems with a very different number of storage rack compartments 3 or sensor boxes 6.

A dynamic storage rack system according to the invention can therefore advantageously have a modular structure and can be implemented using standardized modules. This greatly extends the applicability of the system, in which case the same or identical individual components can be used, with the result that large quantities of the individual components can be achieved and the system can be produced in an economically favorable manner.

LIST OF REFERENCE SYMBOLS

1 Storage rack
2 Storage rack level
3 Storage rack compartment
4 Material container
5 Sensor
6 Sensor box
7 Storage rack box
8 Plug
9 Cable
10 Luminaire
11 Master
12 Data memory
13 Data system
14 Display
15 Input device
16 Loudspeaker
A Distance

What is claimed is:

1. A dynamic storage rack apparatus for providing material in logistics and/or manufacturing processes comprising:
  (a) a plurality of storage rack compartments (3) inclined in the longitudinal direction with each storage rack compartment of the plurality of storage rack compartments accommodating a plurality of material containers (4) disposed beside one another in a longitudinal direction, said plurality of storage rack compartments (3) each having a plurality of adjustable sensors (5) for monitoring a filling level of each of the plurality of storage rack compartments (3), at a distance (A) which corresponds substantially to a length of the plurality of material containers (4) accommodated in the plurality of storage rack compartments (3) in the longitudinal direction between each sensor of the plurality of adjustable sensors (5) for the respective plurality of storage rack compartments (3), said plurality of storage rack compartments (3) with each of said plurality of storage rack compartments having at least one state display apparatus (10) for displaying the state and/or filling level of each one of the respective plurality of storage rack compartments (3);
  (b) a plurality of compartment checking stationary units (6) for checking each one of the respective plurality of adjustable sensors (5) of each of the respective plurality of storage rack compartments (3), the plurality of compartment checking stationary units (6) having energy and data transmission units to supply each of the respective adjustable sensors (5) of the plurality of storage rack compartments (3) with electrical energy and for acquiring, receiving and transmitting sensor data from each one of the respective sensors of the plurality of adjustable sensors (5) of the respective storage rack compartment for the plurality of storage rack compartments (3);
  (c) at least one storage rack checking unit (7) or storage rack box (7) for checking the plurality of compartment checking stationary units (6) of the plurality of storage rack compartments (3), the at least one storage rack checking unit (7) or storage rack box 7 to supply the plurality of compartment checking stationary units (6) of the respective storage rack compartment of the plurality of storage rack compartments (3) with electrical energy and to acquire, receive and transmit data from the plurality of compartment checking stationary units (6);
  (d) at least one central checking unit (11, 12, 13) to acquire, receive and transmit data from the at least one storage rack checking unit (7) or storage box (7) for checking the at least one storage rack checking unit (7) or storage box (7); and
  (e) a series connection of the plurality of compartment checking stationary units (6) or sensor boxes (6) wherein the at least one storage rack checking unit (7) or a storage rack box (7) is disposed at one end of the series connection and wherein the at least one storage rack checking unit (7) or the storage rack box (7) transmits an item of information to an adjacent compartment checking unit of the plurality of compartment checking stationary units (6) or a first sensor box (6), so that the at least one central checking unit or first sensor box (6) confirms its input (1) is connected to the at least one storage rack checking unit (7) or the storage rack box (7) and confirms this with a response or an acknowledgment signal or a so-called ACK signal, wherein the at least one compartment checking stationary unit (6) or first sensor box (6) also transmits an item of information or message to an adjacent compartment checking unit of the plurality of compartment sensing units or a second sensor box (6), so that this neighboring compartment checking unit of the plurality of compartment sensing units or a second sensor box (6) now confirms that its input (1) is connected to the at least one of the plurality of compartment checking stationary units or the first sensor box (6) arranged before it and confirms this with a response or an acknowledgment signal or an ACK signal, with the response or an acknowledgment signal or an ACK signal continuing until the at least one compartment checking unit or the last sensor box (6) in the series connection does not receive a response from the next neighboring at least one of the plurality of compartment checking stationary units or sensor box (6) which is not present in the series connection, so that a response or an acknowledgment signal or a so-called ACK signal does not come from the neighboring box, the last compartment checking stationary unit of the at least one of the plurality of compartment stationary checking units or sensor box (6) in the series connection confirms it is the last compartment checking stationary unit or sensor box (6) inside the communication system to implement an automated position detection or position allocation/addressing system.

2. The apparatus according to claim 1 wherein the series connection connects the plurality of storage rack checking units (7).

3. The apparatus according to claim 1 wherein a star connection connects the plurality of storage rack checking units (7).

4. The apparatus according to claim 1 further comprising at least one radio unit (7, 11) for wirelessly transmitting data and/or energy at least between the central checking unit (11, 12, 13) and the at least one plurality of storage rack checking units (7).

5. The apparatus according to claim 1 further comprising at least one sensor radio unit for wirelessly transmitting data and/or energy at least between the central checking unit (11, 12, 13) and one of the plurality of adjustable sensors (5).

6. The apparatus according to claim 1 further comprising at least one state display apparatus (10) arranged in an end region of at least one of the plurality of storage rack compartments (3).

7. The apparatus according to claim 1 further comprising at least one input unit (15) for inputting/reading information/data relating to at least one of the plurality of material containers (4) and/or a material therein.

8. The apparatus according to claim 1 further comprising at least one output unit (14, 16) for outputting/displaying information/data relating to one container of the plurality of material containers (4) and/or a material therein.

9. The apparatus according to claim 8 wherein the at least one output unit (14, 16) is an acoustic and/or optical warning unit (14, 16) for acoustically and/or optically warning of incorrect action.

10. The apparatus according to claim 1 further comprising at least one confirmation unit (15) for confirming actions which have been carried out.

* * * * *